United States Patent

[11] 3,563,514

| [72] | Inventor | Robert Shattuck<br>Chicago, Ill. |
|---|---|---|
| [21] | Appl. No. | 712,175 |
| [22] | Filed | Mar. 11, 1968 |
| [45] | Patented | Feb. 16, 1971 |
| [73] | Assignee | Borg-Warner Corporation<br>Chicago, Ill.<br>a corporation of Delaware |

[54] PLASTICIZER WITH FULL DIAMETER ROTOR
7 Claims, 4 Drawing Figs.

[52] U.S. Cl.................................................... 259/9;
18/30
[51] Int. Cl..................................................... B01f 7/08
[50] Field of Search........................................ 259/9, 10,
109, 110, 25, 26, 45, 465, 6, 21, 40, 41, 105;
18/31, 12 (SS), 12 (SV)

[56] References Cited
UNITED STATES PATENTS
| 2,499,398 | 3/1950 | Lyon............................. | 18/12 |
| 3,183,553 | 5/1965 | Slater............................ | 259/9 |
| 3,191,234 | 6/1965 | Hendry......................... | 18/12 |

Primary Examiner—Robert W. Jenkins
Attorney—Woodhams, Blanchard and Flynn

ABSTRACT: A plasticizing apparatus comprising a feed barrel having a constant diameter opening therethrough, the feed barrel having a rotatable feed screw mounted at one end thereof and a rotatably driven plasticizing element mounted in the other end thereof. The feed screw and the rotor both have a diameter substantially equal to the interior diameter of the feed barrel opening and are coaxially positioned within the opening so as to define a compression and plasticizing zone. The end of the rotor adjacent the feed screw is provided with a steep conical face thereon for coacting with the plastic material for plasticizing same. The screw feeds particulate plastic material into the compression zone whereby the powder is highly compacted and compressed within this zone, the compressed powder thus being forced against the face of the rotor so as to plasticize the material. Passageways are provided for withdrawing the volatiles from the plasticizing region, the volatiles being withdrawn through the compacted and compressed material within the compression zone.

PATENTED FEB 16 1971

3,563,514

INVENTOR.
ROBERT SHATTUCK
BY
Woodhams, Blanchard & Flynn
ATTORNEYS 3,563,514

PLASTICIZER WITH FULL DIAMETER ROTOR

FIELD OF THE INVENTION

The present invention relates to a plasticizing apparatus wherein a screw member feed granular or powdered plastic material into a plasticizing region adjacent a rotating plasticizing element whereby the frictional effects of the plasticizing element heat and melt the plastic material adjacent the surface of the rotating plasticizing element, the plasticized material then being fed into a conventional injection mold or extrusion die.

BACKGROUND OF THE INVENTION

The devolatilization of plastic materials has long been a major problem in the plastication and fabrication of plastics. Many plastic materials are hygroscopic and thus have a tendency to absorb a considerable amount of moisture. Further, the amount of moisture absorbed by the materials is dependent upon the environmental conditions, such as humidity and temperature, which conditions undergo considerable variations so that the amount of moisture absorbed by the material is highly variable. Also, in the manufacture of some plastic materials, other volatiles are inherently present and these volatiles are released during the plasticizing operation and must be removed from the material. The problem of removing volatiles from the plasticized material has never been satisfactorily solved and the retention of volatiles within plastic material has often caused products fabricated from the material to have bubbles therein, which products thus are of an inferior quality.

To assist in the drying of plastic materials, the plastic industry at present often utilizes dryers in the form of hoppers or trays, which dryers contain the granular or particulate plastic material therein, whereupon the dryers are heated at a fairly low temperature so as to assist in drying and removing the moisture and other volatiles from the plastic material. However, use of these dryers is undesirable and inefficient since the material often must be maintained within the dryer for a considerable length of time in order to remove any appreciable amount of moisture from the material. Further, the use of such dryers still does not solve the devolatilization problem since the dryers are often ineffective to completely remove all of the moisture and since additional volatiles are released during the plasticizing operation, which volatiles tend to become trapped in the material and cause the material to be of an inferior quality.

The prior art is most closely represented by the plasticizing device illustrated in U.S. Pat. No. 3,358,334, The plasticizing apparatus of the above patent comprises feed barrel having a first opening in one end thereof rotatably and snugly receiving therein a rotatable conical plasticizing element. The other end of the feed barrel is supplied with a second opening coaxially aligned with and connected to the first opening, a feeding device, such as a ram or a screw, being operably received within the second opening. The second opening is of substantially smaller diameter than the first opening and is interconnected thereto by means of a tapered portion located in the region of AND closely surrounding the conical nose of the plasticizing element. The tapered portion of the feed barrel generally has an inclination substantially equal to, that is, within at least a few degrees of, the inclination formed on the nose of the rotor element. The tapered portion thus effectively forms a seat surrounding the nose of the plasticizing element. Further, the end of the feed screw is positioned closely adjacent to the nose of the plasticizing rotor. Plastic particles such as amorphous or regular powder, granules or the like, hereinafter referred to generally as granular plastic material, is thus fed and compressed by the feeding device into a small region closely adjacent the nose of the plasticizing rotor whereby the material is at least partially plasticized and moved radially outwardly along the conical face of the rotor, thereby being completely plasticized, with the material then being moved to a dispensing port.

The plasticizing apparatus disclosed in Pat. No. 3,358,334 has proven to he highly successful and results in a satisfactory plasticizing operation for most applications. However, the above device is limited in the amount of volatiles which can be withdrawn from the plasticizing region. The conical seat and the small diameter feeding device necessarily define a feeding region closely adjacent the nose of the conical rotor having a relatively small cross-sectional area. Thus, the volatiles produced by the plasticizing operation cannot always be completely withdrawn from this small region and the resulting plasticized product sometimes contains small amounts of volatiles trapped therein. Such a small amount of volatiles may be a of little consequence in some plastics products. However, where it is desired to produce a high grade product which is essentially free of bubbles, this small feeding region often inhibits and prevents removal of a sufficient amount of the volatiles to produce a resultant product of a desired quality.

Accordingly, it is an object of this invention to provide:

1. A plasticizing apparatus capable of removing substantially all volatiles from the plasticized material.

2. A plasticizing apparatus, as aforesaid, wherein the e devolatilization of the plasticized material is carried out at a substantially high temperature.

3. A plasticizing apparatus, as aforesaid, wherein the devolatilization is carried out under a vacuum.

4. A plasticizing apparatus, as aforesaid, wherein the plasticizing apparatus is of the frictional type and has a feed screw of substantially equal diameter as the plasticizing rotor so as to define a relatively large compression and plasticizing zone.

5 A plasticizing apparatus, as aforesaid, wherein a plasticizing rotor and a feed screw of substantially equal diameter are coaxially aligned within a feed barrel having a constant diameter opening therethrough.

6. A plasticizing apparatus, as aforesaid, wherein the compression zone has a large and unobstructed cross-sectional area to permit substantially all volatiles to be removed from the plasticizing zone, 7. A plasticizing apparatus, as aforesaid, which is more economical to manufacture and more efficient to maintain.

Other objects and advantages of the present invention will be apparent to persons acquainted with devices of this type upon reading the accompanying description and inspecting the accompanying drawings.

SUMMARY OF THE INVENTION

Figures 1, 2, 3, 4:
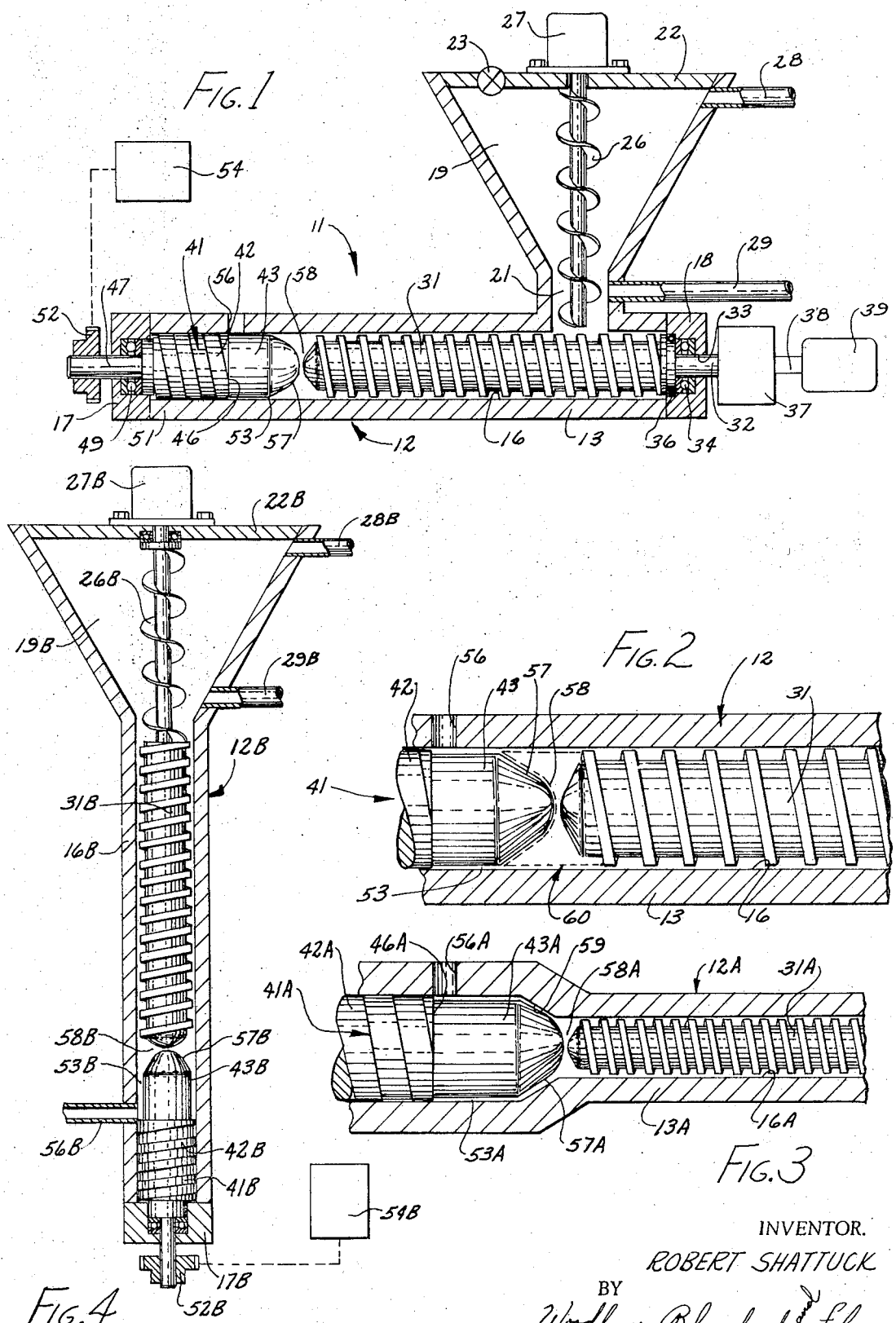
FIG. 1 is an elevational view, partially in cross section, illustrating the plasticizing apparatus of the present invention.
FIG. 2 is an enlargement of a portion of FIG. 1 illustrating the plasticizing zone.
FIG. 3 is a partial sectional view similar to FIG. 2 illustrating the plasticizing zone of the apparatus disclosed in Pat. No. 3,358,334.
FIG. 4 is an elevational view, partially in cross section, of an alternate embodiment of the present invention.

The present invention relates to a plasticizing apparatus which represents an improvement of the device illustrated in Pat. No. 3,358,334 by permitting more complete removal of the volatiles released by the plasticizing operation.

In particular, the objects and purposes of the present invention are achieved by providing a plasticizing apparatus wherein a feed barrel has a coaxially aligned feed screw and plasticizing element rotatably mounted in respective opposite ends thereof. The feed barrel is provided with a constant diameter feed opening therethrough whereby the feed screw and the rotor are of substantially equal diameters. The adjacent ends of the feed screw and the rotor define a working zone adjacent and between the ends thereof. Granular plastic material is fed from a hopper into the feed screw which in turn feeds the material into the working zone adjacent the end face of the rotating plasticizing element. Continual feeding of material by the feed screw causes the granular material in the working zone to be tightly compacted and pressed against the end face of the rotor. The rotor, which is preferably provided with a tapered conical face thereon, is rotatably driven at a high speed whereby the plastic material compressed against the conical face is rapidly frictionally heated and plasticized. The plasticized material then moved radially outward over the conical face into a small passage between the rotor and the feed barrel and from which it is then transferred to a feed outlet. The feed barrel or the hopper is further interconnected to a suction source whereby the volatiles released during the plasticizing operation are withdrawn through the unplasticized granular material from the plasticizing region The working zone, having a large and unobstructed cross-sectional area, permits withdrawal of substantially all of the hot volatiles from the plasticizing region, thereby resulting in a high quality product. Also, the large working zone permits a greater amount of material to be plasticized by the device and thus results in a greater delivery rate by the machine.

DETAILED DESCRIPTION

A preferred embodiment of my invention is illustrated in FIGS. 1 and 2 wherein there is shown a plasticizing apparatus 11 having a feed barrel or housing 12 which comprises a generally tubular section 13 having a cylindrical opening 16 therein, the ends of the tubular section 13 being closed by means of end plates 17 and 18 connected thereto by any suitable means such as by welding or by bolts. A hopper 19 is mounted directly above the feed barrel adjacent one end thereof, the hopper being interconnected to the feed barrel by means of a hopper feed opening 21 whereby the interior of the hopper is in communication with the opening 16 of the feed barrel. The hopper is preferably sealed by means of a cover plate 22 having a lock feeder 23 positioned therein so as to permit granular or powdered plastic material to be fed into and stored within the hopper 19.

The raw granular plastic material contained within the hopper 19 can be fed into the feed barrel by means of gravity if so desired. However, it is preferably to mount a conveyor screw member 26 within the hopper whereby rotation of this screw will forcibly transfer material from the hopper to the feed barrel 12. The screw 26 has one end thereof terminating in the hopper feed opening 21 while the other end thereof passes through the cover plate 22 and is connected as convenient to a drive motor 27 which is supported on the cover plate 22 for rotatably driving the screw. The use of a screw within the hopper prevents the material within the hopper from becoming solidified, in which condition the material would be prevented from dropping by gravity into the feed barrel 12. The hopper is also preferably provided with a pair of passageways 28 and 29 leading therefrom, which passageways are connected to a suitable external suction means (not shown) whereby the vapor sand volatiles contained within the hopper and the feed barrel can be removed from the system.

A fed screw 31 is rotatably positioned within one end of the feed barrel 12, the feed screw having an outside diameter substantially equal to, but slightly smaller than, the diameter of the feed opening 16. he feed screw 31 preferably has a large root diameter so as to subject the particulate plastic material within the housing 12 to a large compressive force for a purpose to be explained hereinafter. The feed screw is positioned such that a portion thereof is positioned directly beneath the hopper feed opening 21. The feed screw is provided with a shaft portion 32 which extends through and is rotatably supported in an opening 33 provided in the end plate 18. A thrust bearing 34 is positioned between the feed screw 31 and the end plate 18 for transmitting axial thrusts imposed on the feed screw to the housing 12. AN O-ring 36 is also preferably mounted between the end plate 18 and the shaft portion 32 of the feed screw so as to effectively seal the interior of the feed barrel from the atmosphere. The extending shaft portion 32 is preferably connected to a gear speed reducer 37 which in turn is connected to the drive shaft 38 of a motor 39. While FIG. 1 illustrates the feed screw 31 as being driven by the drive motor 39, it is of course obvious that the fee screw could be driven in any conventional manner.

Other end of the feed barrel 12 has a plasticizing element 41 rotatably mounted therein, which element is axially aligned with and axially spaced from the feed screw 31. The plasticizing element comprises first and second coaxial cylindrical portions 42 and 43 respectively, which portions are interconnected by a reduced section or shoulder 46. The plasticizing element is formed with a bearing shaft portion 47 on one end thereof, which portion extends through an opening 48 contained within the end plate 17 and is rotatably supported therein by means of rotary thrust bearing 49. A bleed seal 51 is preferably formed in on the portion 42 adjacent the end plate 17 so as to effectively seal the interior of the feed barrel 12 from the atmosphere, the bleed seal 51 being more completely illustrated and described in Pat. No. 3,358,334.

The extending bearing shaft 47 is provided with a gear 52 fixedly keyed thereto, which gear is drivingly interconnected to a power source or motor 54 so as to rotatably drive the plasticizing element within the feed barrel. It will, of course, be obvious that the rotating plasticizing element 41 could be driven in any desired manner. For instance, the plasticizing element 41 could be coaxially aligned with and directly connected to the motor 54 or it could be connected to the motor 54 by means of an external drive train consisting of gear, belts or the like. When the plasticizing element 41 is driven by a separate drive motor, it is of course desirably to interconnect the drive motors of the plasticizing element and the feed screw by suitable control means well known in the art so as to permit simultaneous control of the rotation of both the feed screw 31 and the plasticizing rotor 41. On the other hand, if desired, the plasticizing rotor 41 could be interconnected to the drive motor 39 of the feed screw by any suitable well known drive means whereby only a single motor is thus utilized for controlling both the rotor and the feed screw. However, use of separate drive motors is preferred.

As is clearly illustrated in FIG. 2, the first cylindrical portion 42 of the rotor is of a diameter substantially equal to, but slightly less than the diameter of the opening 16 contained in the feed barrel 12 whereby the cylindrical portion is thus snugly but rotatably received therein. The second cylindrical portion 43 is of a smaller diameter than the first cylindrical portion 43 whereby a cylindrical annulus or passageway 53 is defined between the periphery of the second cylindrical portion 43 and the interior wall of the feed barrel 12. The radial clearance comprising the annular passageway 53 will of course vary in magnitude, being dependent upon such factors as the type of plastic, the size of granules, the temperature and the vapor content. The criticalness of the clearance is more thoroughly discussed in Pat. No. 3,358,334. The feed barrel 12 is further provided with an outlet port 56 communicating with the cylindrical passageway 53 in the region adjacent the reduced section or shoulder 46 for a purpose to be explained hereinafter. The front or plasticizing face 57 of the rotor 41 is preferably formed with a conical configuration thereon.

The adjacent ends of the rotor 41 and the feed screw 31 are coaxially spaced adjacent one another and, in conjunction with the interior wall of the feed barrel 13, define a working zone 60, in which zone the particulate or granular material is subjected to extremely high compressive forces since the material is forced into contact with the tapered plasticizing face 57 by means of the rotating feed screw 31. The material within the working zone 60 closely adjacent the tapered plasticizing face 57 is rapidly frictionally heated by the rotation of the rotor 41 and accordingly is plasticized thereby, the position of the working zone which is closely adjacent the plasticizing face 57 thus comprising a plasticizing zone 58. While the material contained within the plasticizing zone, is, for the most part, either partially or completely plasticized, the remainder of the material in the working zone 60 is still substantially granular. The high compressive forces on such granular material act against the material in the plasticizing zone 58 for holding same in engagement with the plasticizing face 57. The granular material in the working zone 60 thus functions substantially in the manner of a stationary seat.

On the other hand, while functioning as a seat, the granular material within the working zone 60 also functions in a manner similar to a porous plug and the volatiles released in or near the plasticizing zone 58 can pass through such granular material so as to permit such volatiles to be withdrawn through the feed barrel and out of the system. Use of a plug of porous granular material subjected to a high compressive force as a seat for holding material within the plasticizing zone tightly adjacent the plasticizing face is thus highly advantageous since it performs not only the holding function but it also provides a large cross-sectional area of porous material through which the volatiles can be withdrawn, thereby greatly increasing the percentage of the volatiles withdrawn from the plasticized material.

FIG. 3 illustrates the plasticizing region of the prior art device disclosed in Pat. No. 3,358,334 when the screw-fed form thereof is used, The same reference numerals are used to represent the corresponding parts and elements of FIGS. 2 and 3, with the numerals of FIG. 3 having the suffix "A" added thereto.

The plasticizing apparatus illustrated in FIG. 3, and shown here for reference purposes to emphasize the exact nature of the present invention, comprises a plasticizing element 41A and a feed screw 31A both of which are rotatably mounted an coaxially aligned within a feed barrel 12A. The plasticizing element 41A is provided with first and second cylindrical portions 42A and 43A, respectively, which are identical to the first and second cylindrical portions 42 and 43 as illustrated in FIG. 2. The plasticizing element 41A is provided with a plasticizing face 57A on one end thereof, which face has a generally conical configuration having a gentle taper thereon converging to form a rounded nose 61 at the end thereof as is clearly shown in FIG. 3. A tapered seat portion 59 is formed within the feed barrel 12A, which seat portion surrounds and closely conforms to the periphery of the tapered plasticizing face 57A so as to compress and compact the granular plastic material into the region surrounding the nose 61 of the rotor whereby sufficient pressure is developed to plasticize the material in response to the rotation of the plasticizing element 41A.

In consequence of the tapered plasticizing face 57A and the seat 59 surrounding the same, the feed screw 31A is necessarily of a much smaller diameter than the rotor member as is clearly illustrated in FIG. 3. The cylindrical opening 16A in which is positioned the feed screw 31A is thus of a relatively small cross-sectional area, and thus withdrawal of volatiles from the plasticizing zone 58A is somewhat restricted.

OPERATION

Although the plasticizing operation of the present invention is believed obvious from the description given above, a brief description of the operation will be given below so as to assure a complete and clear understanding thereof.

Referring to FIGS. 1 and 2, powdered or granular plastic material will be deposited into the feed hopper 19 through the locked feeder 23. Assuming that the hopper screw 26, the feed screw 31, and the plasticizing element 41 are rotating, the material will be carried from the hopper 19 into the opening 16 contained within the feed barrel 12. The material deposited into the feed barrel will then be transferred axially therealong by means of a feed screw 31 until the material reaches the working zone 60 and plasticizing zone 58.

After sufficient material has plasticizing deposited into the zones 58 and 60 so as to fill the same, the feed screw 31 will continue to transfer more material into the zone 60 so as to compact and compress the granular material therein whereupon the material within the plasticizing zone 58 will be forced under high pressure against the tapered plasticizing face 57 of the rotating plasticizing element 41. The feed screw 31 thus functions as a pressure means for compacting and compressing the material contained within the zones 58 and 60. Due to the high rotational speed of the rotor 41, the material within the zone 58 directly adjacent to and compressed against the face 57 by the feed screw 31 will be rapidly heated and plasticized, the plasticizing action taking place at a relatively high temperature, which temperature may be within the range of 300° F. to 450° F., depending upon the material utilized, the speed of rotation of the plasticizing rotor and the pressure imposed by the feed screw. The material will move radially outwardly over the face 57 until it reaches the annular passageway 53, the plasticized material then traveling down the passageway and passing out through the outlet port 56 into a conventional injection mold or appropriate extruding apparatus. Thus, the plasticizing operation is accomplished solely due to the high rotational speed of the rotor 41 and the high compressive pressure applied to the material within the zone 58 by the feed screw 31.

While the plasticizing operation is being carried out, a suction or partial vacuum is maintained within the plasticizing apparatus by means of an external suction source interconnected thereto through the passageways 28 and 29. Since the hopper 19 is in communication with the feed barrel opening 16 by means of the hopper feed opening 21 therebetween, the plastic material within the feed barrel will be subjected to a suction so as to remove the volatiles therefrom. Similarly, the volatiles released adjacent the plasticizing face 57 and within the plasticizing zone 58 during the plastification of the material will be withdrawn axially through the compressed but porous plug of granular material within the working zone 60, the volatiles then being withdrawn axially along the feed screw 31 into the hopper 19 from which they are withdrawn by means of the passageways 28 and 29. Since the zone 60 has a real relatively large and unrestricted cross-sectional area, a partial vacuum developed within the feed barrel is effective in removing a high percentage of the volatiles released during the plasticizing operation and thus the plasticized material delivered by the apparatus is of a high quality, being essentially free of entrapped volatiles and gas vapors.

MODIFICATION

FIG. 4 illustrates a modification of the present invention wherein the plasticizing apparatus is symmetrically positioned about a vertical axis so as to facilitate the transfer of plastic material therethrough. Since the individual components and elements of the invention are basically similar to the embodiment illustrated in FIG. 1, the corresponding parts have been designated by the same reference numerals with the suffix "B" added thereto.

As shown in FIG. 4, the plasticizing apparatus comprises a hopper 19B which is interconnected to the upper end of the feed barrel 12B, the hopper being provided with an opening in the bottom therein communicating with a cylindrical opening 16B formed within the feed barrel. The hopper is preferably closed and sealed by means of a cover plate 22B connected thereto. The interior of the hopper and the feed barrel is evacuated so as to maintain a partial vacuum therein by means of a suction source (not shown) interconnected thereto by means of the passages 28B and 29B. A conveyor screw 26B is coaxially positioned within the hopper and extends substantially down into the opening 16B within the feed barrel 12B, the upper end of the screw 26B being connected to a motor 27B which is fixedly mounted to the cover plate 22B. The lower end of the conveyor screw 26B is fixedly interconnected to the feed screw 31B positioned within the opening 16B. The lower end of the feed barrel 12B has a plasticizing rotor 41B mounted therein for rotation about the vertical axis of the feed barrel. The rotor has a gear 52B externally connected thereto whereby the rotor is driven by means of an external power source 54B. The upper end of the rotor is provided with a plasticizing face 57B having a conical surface thereon. The lower end of the feed screw 31B and the plasticizing face 57B of the rotor are axially spaced closely adjacent one another with the region adjacent the plasticizing face 57B constituting a plasticizing zone 58B. The granular plastic material is plasticized by the rotating face 57B from which the material then passes downwardly through the cylindrical passageway 53B and out through the outlet port 56B.

The operation of the plasticizing apparatus illustrated in FIG. 4 is substantially identical to the operation of the device illustrated in FIG. 2 as explained above and thus further explanation thereof is not necessary.

The present invention thus relates to a plasticizing machine which possesses a larger feed screw in proportion to the size of the plasticizing rotor and thus results in a larger cross-sectional area being provided between the plasticized and the unplasticized material so that a more complete withdrawal of the volatiles will be obtained. Further, the present invention eliminates the need for a fixed seat closely surrounding the plasticizing rotor so as to define a narrow space therebetween through which the plastic material must move, thus permitting the apparatus of the present invention to be able to deliver a larger quantity of plasticized material than in prior known devices.

The plasticizing apparatus according to the present invention thus permits devolatilization of plastic materials to be carried out at much higher temperatures and under vacuum or partial vacuum conditions. This combination of a high temperature and a vacuum environment thus permits substantially complete removal of all volatiles from the plasticized material. Further, this should result in the plasticized material having less heat history and consequently resulting in a plastic material of improved quality. It is also conceivable that some kinds of volatile materials, such as those with very high boiling hydrocarbon constituents, cannot be removed from plastic materials except under vacuum conditions and at extremely high temperatures. The present device is able to withdraw these volatiles from the plasticized material and thus the present invention results in an advantageous operation which was not possible with the prior known plasticizing devices.

In order to permit the volatiles to become completely withdrawn from the system, it will of course be necessary to maintain the volatiles at a sufficient temperature so as to prevent their condensation before being completely withdrawn from the plasticizing device. Accordingly, the rearward end of the feed barrel 13 adjacent the feed opening 21 may have to be surrounded with heating chambers or similar devices containing warm air or water therein so as to prevent the volatiles from cooling to a temperature below the condensation temperature. Similarly, it may be desirable to provide a cooling jacket in surrounding relationship to the forward end of the feed barrel 13 adjacent the plasticizing rotor 41 so as to prevent premature plasticizing of the material before the material reaches the interface area adjacent the plasticizing face 57 whereupon most of the volatiles are released.

The present invention could under same circumstances, as where withdrawal of volatiles is of minor importance, and batch operation is acceptable, be modified by replacing the feed screw with a reciprocable ram member, the ram having a diameter substantially equal to the rotor diameter. Such a ram member would effectively feed and compress the granular material into the compression and plasticizing zone.

Although a particular preferred embodiment of apparatus appropriate for carrying out the method and apparatus embodying the invention has been disclosed in detail hereinabove for illustrative purposes, it will be understood that variations and modifications of such disclosure which lie within the scope of the appended claims are fully contemplated.

I claim:

1. An apparatus for plasticizing particulate plastic material comprising:
   a housing having a cylindrical opening therethrough;
   a plasticizing means rotatably mounted within said opening and having a cross section substantially equal to the cross section of said opening, said plasticizing means comprising a rotor rotatably mounted within said opening;
   pressure creating means rotatably mounted within said opening and having a cross section substantially equal to the cross section of said opening, the cross section of said pressure creating means being substantially equal to the cross section of said rotor;
   said rotor and said pressure creating means being axially spaced along said cylindrical opening and cooperating with said housing to define a working zone for receiving particulate plastic material therein; and
   said pressure creating means also feeding particulate plastic material to said working zone whereby said pressure creating means compacts said material and forces a portion thereof into bearing contact with said plasticizing means for plastification thereof.

2. An apparatus according to claim 1, wherein said rotor has a plasticizing face formed on one end thereof defining one wall of said working zone, the plasticizing face having a conical configuration.

3. An apparatus according to claim 2, further including suction means interconnected to said cylindrical opening at a location axially removed from said rotor so as to create a partial vacuum within said opening whereby to withdraw volatiles from the working zone adjacent the rotor, the volatiles being withdrawn through the particulate material contained within the zone.

4. An apparatus according to claim 1, wherein said rotor has a cylindrical portion having a diameter slightly less than the diameter of the cylindrical opening so as to define a narrow passageway therebetween, the rotor also having a tapered conical end face confronting the end of the pressure creating means.

5. An apparatus according to claim 1, further including means for withdrawing volatiles from the plastification region adjacent the rotor through the particulate material contained within said working zone.

6. An apparatus according to claim 1, wherein said pressure creating means comprises a feed screw coaxially positioned within said cylindrical opening, one end of said screw terminating adjacent said rotor.

7. An apparatus according to clam 6, further including an enclosed hopper mounted above one end of the housing, the interior of the hopper being interconnected with the cylindrical opening in the region of the feed screw; and suction means connected to the interior of said hopper so as to create a partial vacuum therein thereby to withdraw the volatiles from the plasticizing region adjacent the rotor, the volatiles being withdrawn through the particulate material contained within the working zone and then through the particulate material contained in the feed screw and the hopper.

UNITED STATES PATENT OFFICE
CERTIFICATE OF CORRECTION

Patent No. 3 563 514        Dated February 16, 1971

Inventor(s) Robert Shattuck

It is certified that error appears in the above-identified patent and that said Letters Patent are hereby corrected as shown below:

Column 1, line 5; "feed" should read ---feeds---;

line 50; "334," should read ---334.---;

line 51; "feed" should read ---a feed---;

Column 3, line 56; "vapor sand" should read ---vapors and--- line 62; "he" should read ---the---.

Column 4, line 30; "gear" should read ---gears---;

line 32; "desirably" should read ---desirable---.

Column 5, line 72; "plasticizing" should read ---been---.

Column 6, line 39; "real relatively" should read ---relative

Column 7, line 58; "same" should read ---some---.

Signed and sealed this 13th day of July 1971.

(SEAL)
Attest:

EDWARD M. FLETCHER, JR.
Attesting Officer

WILLIAM E. SCHUYLER, J.
Commissioner of Patent